United States Patent
Sasu et al.

(10) Patent No.: US 6,935,817 B2
(45) Date of Patent: Aug. 30, 2005

(54) AIRFOIL MACHINING USING CUP TOOL

(75) Inventors: Ioan Sasu, Brossard (CA); Bertrand Turcotte, Ste-Julie (CA)

(73) Assignee: Pratt & Whitney Canada Corp., Longueuil (CA)

( * ) Notice: Subject to any disclaimer, the term of this patent is extended or adjusted under 35 U.S.C. 154(b) by 167 days.

(21) Appl. No.: 10/217,423

(22) Filed: Aug. 14, 2002

(65) Prior Publication Data

US 2004/0033115 A1 Feb. 19, 2004

(51) Int. Cl.$^7$ ................................................. B23C 3/18
(52) U.S. Cl. ........................ 409/132; 409/26; 409/120; 409/122; 29/557; 29/889.23
(58) Field of Search ................ 409/120, 26, 25, 409/29, 132, 66, 65, 75–76, 77, 122, 123; 29/558, 557, 889, 889.7, 889.23, 889.6, 559

(56) References Cited

U.S. PATENT DOCUMENTS

| | | | |
|---|---|---|---|
| 1,969,843 A | * | 8/1934 | Head ............................ 409/26 |
| 2,284,636 A | * | 6/1942 | Carlsen ........................ 409/26 |
| 2,510,528 A | * | 6/1950 | Soper ........................... 409/26 |
| 2,962,941 A | * | 12/1960 | Stein et al. ................. 409/120 |
| 3,138,995 A | * | 6/1964 | Treverton .................... 409/25 |
| 3,143,923 A | * | 8/1964 | Krzyszczuk ................. 409/313 |
| 3,288,031 A | * | 11/1966 | Krastel et al. ................ 409/26 |
| 3,571,876 A | | 3/1971 | Blakesley |
| 3,713,194 A | | 1/1973 | Danly |
| 3,768,917 A | | 10/1973 | Hunkeler |
| 3,811,163 A | | 5/1974 | Frederick et al. |
| 4,352,609 A | | 10/1982 | Hopkins |
| 4,412,765 A | * | 11/1983 | Occhialini ...................... 409/6 |
| 4,518,287 A | | 5/1985 | Bossler, Jr. |
| 4,799,337 A | * | 1/1989 | Kotthaus ...................... 409/26 |
| 5,290,135 A | | 3/1994 | Ball et al. |
| 5,330,295 A | | 7/1994 | Pawlik |
| 5,820,308 A | | 10/1998 | Hoefler |
| 2005/0025598 A1 | * | 2/2005 | Nowak et al. ............... 409/132 |

FOREIGN PATENT DOCUMENTS

FR    2244593 A1 * 5/1975
GB    2276575 A * 10/1994

* cited by examiner

Primary Examiner—Erica Cadugan
(74) Attorney, Agent, or Firm—Ogilvy Renault

(57) ABSTRACT

Airfoil blades are machined in a workpiece using a circular machining tool defining a machining ring having inner and outer circumferential surfaces. The airfoil blades are created by generating engagement movements between the rotating circular machining tool and the workpiece so as to define a concave side of an airfoil with the outer circumferential cutting surface of the machining ring and a convex side of an adjacent airfoil with the inner circumferential cutting surface of the machining ring.

17 Claims, 3 Drawing Sheets

AIRFOIL MACHINING USING CUP TOOL

BACKGROUND OF THE INVENTION

1. Field of the Invention

The present invention relates to the machining of airfoil blades for gas turbine engines.

2. Description of the Prior Art

The complex shape of airfoils, such as gas turbine engine rotor blades, is a characteristic that impede economical methods of milling. The normal manner to produce this complex shape is a technology using the point milling method. According to the point milling method, a ball end mill is used to machine an airfoil. The tool path is programmed such that the tool's ball nose creates the part profile point by point. This method uses a limited portion of the cutter and is time consuming. The relatively poor productivity is explained by the fact that it takes a huge number of passes for the tool to cover all the airfoil surface points. In addition, the tool has a relatively poor rigidity, which limits the tool load.

In order to minimize the number of tool passes, flank milling was developed for airfoil machining. In flank milling, a taper ball end mill is used. The tool path is programmed such that the tool has a curved contact surface with the airfoil. The whole surface of the airfoil is produced by one single tool pass, increasing considerably the productivity with respect to the point milling method. The tool (a taper ball end mill) is characterized by a small diameter and a long flute length. Because of the part being milled, the tool shank is very long as well. All this results in reduced tool rigidity. The poor tool rigidity and the long axial tool immersion, limit the tool load. This results in a relatively poor metal removal rate, which is not suitable especially for the roughing operations.

To improve productivity, there is thus a need for a new airfoil machining method which allows the use of a stronger tool and a higher chip load.

SUMMARY OF THE INVENTION

It is therefore an aim of the present invention to provide an improved process for machining airfoils into a workpiece.

It is also an aim of the present invention to reduce the cost of manufacturing airfoils.

It is a further aim of the present invention to provide a method for manufacturing a gas turbine engine rotor with higher productivity.

Therefore, in accordance with the present invention, there is provided a method for machining an integrally bladed rotor from a workpiece to form radially extending airfoil blades, comprising the steps of: mounting the workpiece on a workpiece holder of a numerically controlled multi-axis machining system, providing said multi-axis machining system with a circular machining tool defining a machining ring having concave and convex circumferential machining surfaces, machining successive circumferentially spaced-apart airfoil blades at the periphery of the workpiece, under the direction of a machine program of the numerically controlled multi-axis machining system, by causing an arcuate portion of said machining ring to successively engage the workpiece at predetermined circumferential locations with said concave and convex circumferential surfaces being respectively used to machine a convex suction side and a concave pressure side of two consecutive airfoil blades.

In accordance with a further general aspect of the present invention, there is provided a method for machining airfoils in a workpiece utilizing a numerically controlled multi-axis machining system, comprising the steps of: a) mounting the workpiece to a fixture forming part of the numerically controlled multi-axis machining system, b) providing said machining system with an annular machining tool having inner and outer circumferential machining surfaces, c) under the direction of a machine program of the numerically controlled multi-axis machining system, generating movements between the workpiece and said annular machining tool to define in the workpiece opposed facing convex and concave airfoil surfaces respectively with said inner and outer circumferential cutting surfaces of said machining ring.

In accordance with a still further general aspect of the present invention, there is provided a method of machining airfoil surfaces in a workpiece utilizing a numerically controlled multi-axis machining system, the method comprising the steps of: a) mounting a workpiece on a workpiece holder forming part of the numerically controlled multi-axis machining system, b) providing said multi-axis machining system with a rotating circular machining tool defining a machining ring having inner and outer circumferential machining surfaces, and, machining a curved slot in a periphery of the workpiece by generating engagement movements between the rotating circular machining tool and the workpiece so as to generate a concave side of a first airfoil with said outer circumferential machining surface of said machining ring and a convex side of an adjacent airfoil with the inner circumferential machining surface of said machining ring.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

A gas turbine engine generally comprises in serial flow communication a fan through which ambient air is propelled, a multistage compressor for pressurizing the air, a combustor in which the compressed air is mixed with fuel and ignited for generating hot combustion gases, and a turbine for extracting energy from the combustion gases. Both the fan and the compressor include airfoils in the form of rotor blades extending radially outwardly from the periphery of a disc.

The blades can be provided with dovetails which slide in corresponding dovetail slots defined in the perimeter of the disc or, alternatively, they can extend integrally from the disc to form a one-piece unitary assembly, known as integrally bladed rotor. As will be seen hereinafter, the present invention is particularly suited for the rough machining of such fan or compressor rotors. However, it is understood that the present invention could be used for machining other types of airfoils.

More particularly, the present invention provides a new machining method by which rotor blades can be produced using different processes, such as conventional cutting, grinding, electro-grinding, electrical discharge machining (EDM) and electrochemically machining (ECM).

Figure 1:
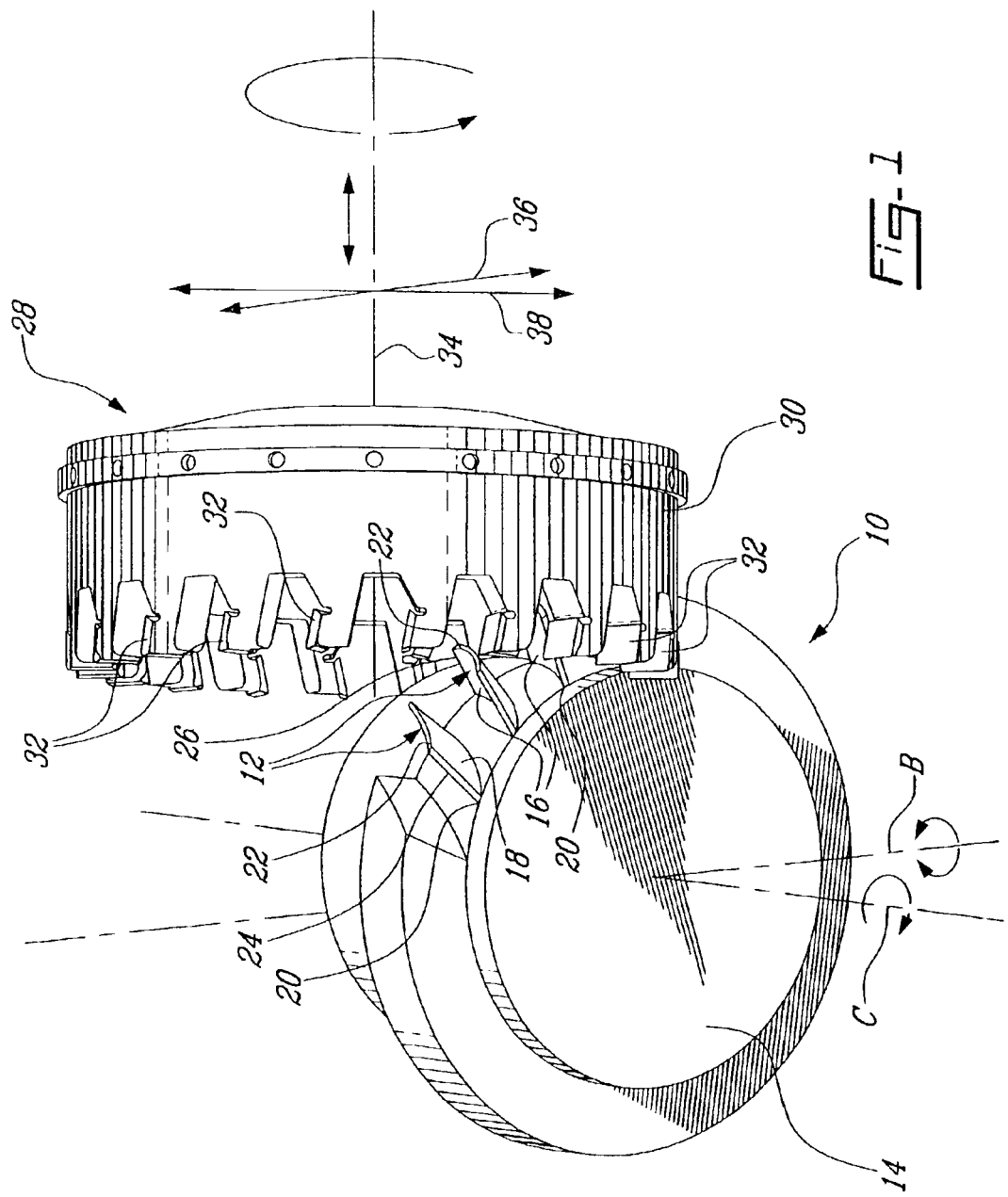
FIG. 1 is a perspective view of an integrally bladed rotor in the process of being machined in a workpiece with a circular milling tool in accordance with a preferred embodiment of the present invention.

FIG. 1 shows a workpiece 10 in the exemplary form of a solid disc in the process of being machined into a gas turbine engine rotor including a plurality of circumferentially spaced-apart airfoil blades 12 extending integrally radially outwardly from a central hub portion 14. Each blade 12 has a generally concave pressure side 16 and a generally convex suction side 18 extending from root 20 to tip 22 between opposed leading and trailing edges 24 and 26.

The workpiece 10 is machined in a numerically controlled multi-axis machine (not shown) adapted to operate a circular or annular machining tool, for instance, in the form of a cup mill 28 having a cup-shaped body 30 carrying a plurality of circumferentially spaced-apart cutting inserts 32 defining a cutting ring of a radius preferably close to the desired radius of curvature of the airfoil blades 12 to be machined in the workpiece 10.

According to a preferred embodiment of the present invention, the multi-axis milling machine has five axes or degrees of freedom. The machine is adapted to rotate the cup mill 28 about a central axis 34 (spindle) generating the cutting movement. The appropriate relative position between the workpiece and the cup mill 28 is provided by three translating axes 34, 36 and 38 and two rotating rotating axes b and c which are generally perpendicular to each other. The axis b is in-line with one of the translation axes 34, 36 and 38 (in general with the axis 38). The workpiece is mounted in a fixture (not shown) concentric with the axis C.

Figure 2:
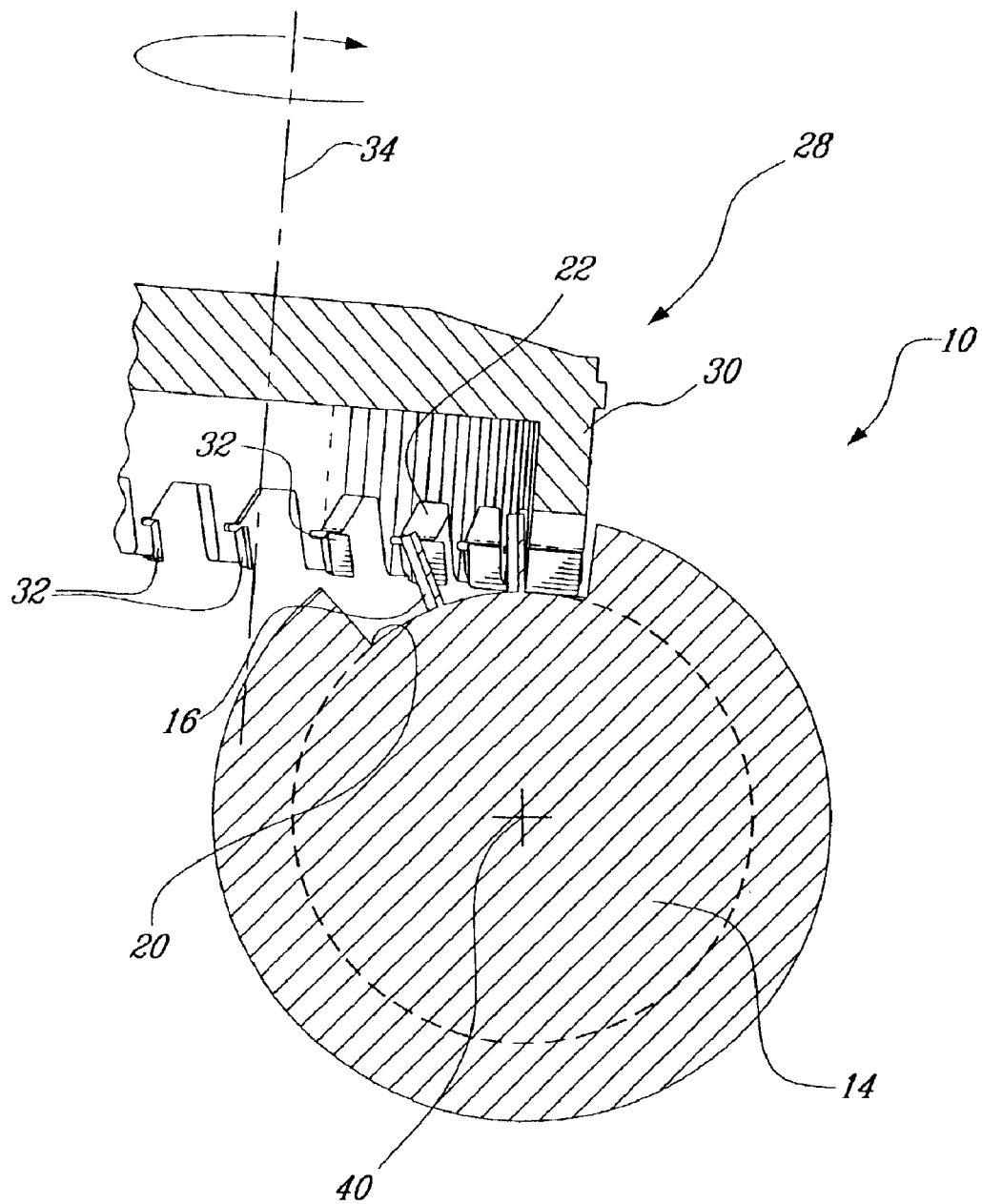
FIG. 2 is a cross-sectional view of the workpiece and the circular machining tool illustrating how a convex suction side of one airfoil blade is machined in the workpiece using the inner circumferential surface of the tool.
Figure 3:
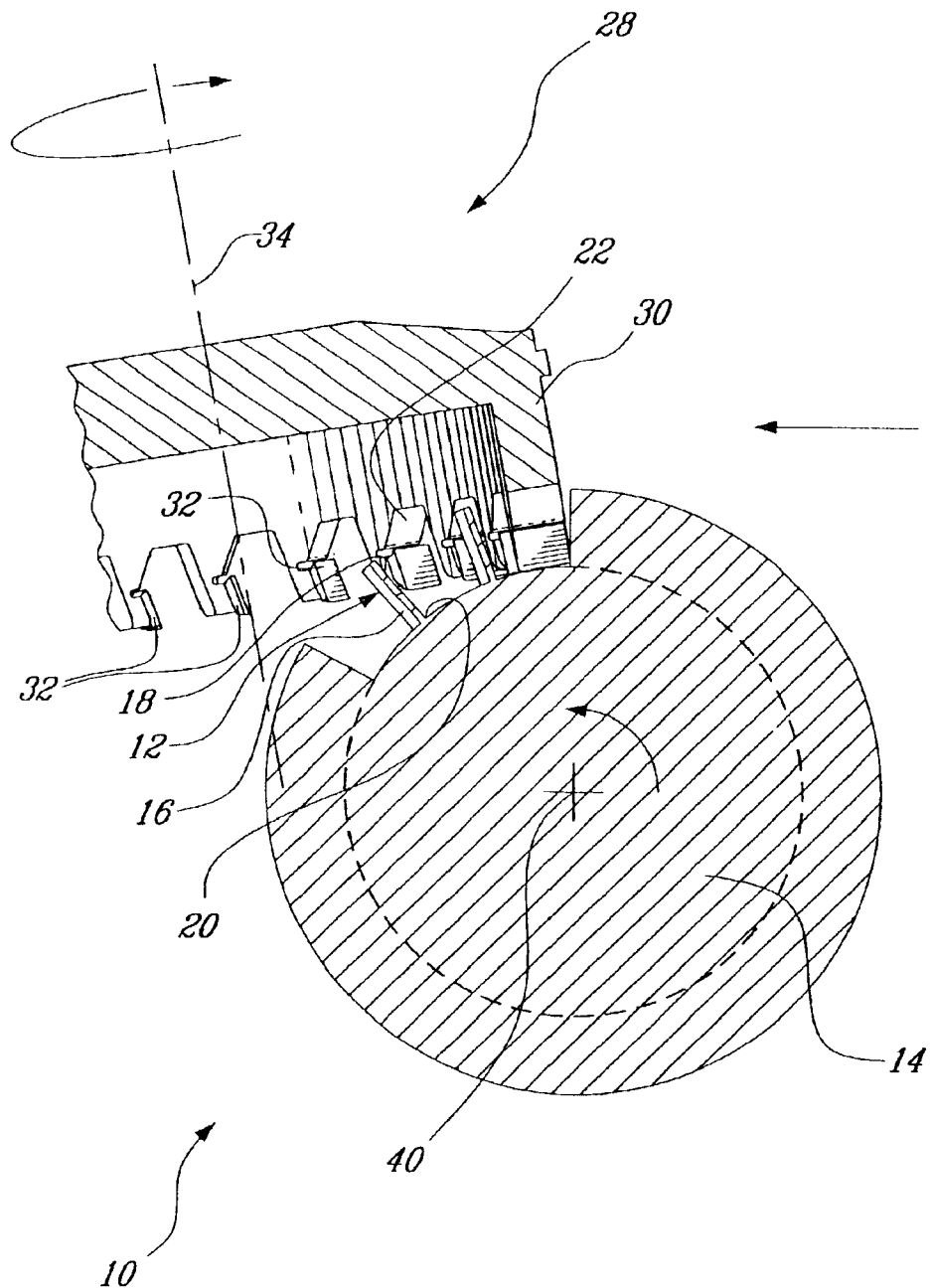
FIG. 3 is a cross-sectional view of the workpiece and the circular machining tool illustrating how a concave pressure side of another airfoil blade is machined in the workpiece using the outer circumferential surface of the tool.

Referring to FIGS. 2 and 3, rough milling of a pair of facing airfoil surfaces is effected by plunging the rotating cup mill 28 into the peripheral circumferential surface of the workpiece 10 and by generating movements between the workpiece 10 and the cup mill 28 so as to cause the cutting ring defined by the circumferentially spaced-apart cutting inserts 32 to move in what will become a pocket between two consecutive airfoil blades 12 in a way such as to remove material from the workpiece 10 always near to the root of the airfoil blades being machined. That is to say that the opposed facing airfoil surfaces (i.e. the sidewall of the pocket) are cut as the pocket is being deepened, as opposed of being milled after the pocket has been deepened to its full depth. The resulting pocket will have the convex suction side of one blade and the concave pressure side of an adjacent blade.

As shown in FIG. 2, the convex suction side 18 of the airfoil blades 12 is formed with the inner circumferential surface of the cutting ring. Referring to FIG. 3, it can be seen that the concave pressure side surface 16 of the airfoil blades 12 is formed with the outer circumferential surface of the cutting ring of the cup mill 28. The movements of the cup mill 28 relative to workpiece 10 are generally characterized by an axial and a radial feed (depending of the slot profile to be generated between two consecutive airfoil blades). As shown in FIG. 1, the cup mill 28 is generally slightly inclined from a radial axis of the workpiece 10, while cutting the airfoil blades.

Such a machining of a pair of facing airfoil blades 12 using the outer and inner circumferential surfaces of the cup mill 28 requires a special relative tool-part movement. The machine program has to simultaneously control the engagement of the forward annular end of the cup mill 28 as well as the outer and inner circumferential surfaces thereof with the workpiece 10.

Milling at the root 20 of the blades 12 (i.e. where the rigidity of the blades is maximal) is advantageous in that it permits a more aggressive cutting, thereby reducing the time required for roughing the airfoil blades 12.

As can be seen from FIGS. 1 to 3, in operation, the rotation axis 34 of the cup mill 28 is located outside of the slot being defined between two consecutive blades 12. That is to say that the axis 34 is offset from the slot being defined. Only an arcuate portion of the rotating cutting ring defined by the cup mill 28 is engaged with the workpiece 10 at a given moment. This contributes to increase the life of the machining tool by allowing the portions of the tool which are not engaged with the workpiece 10 to cool down.

The cup-shaped body 30 of the cup mill 28 defines an internal cavity, which is deep enough to avoid any interference with the airfoil blades 12 located inside the cutting ring defined by the cup mill 28.

The use of such a cup-shaped cup mill 28 is advantageous in that it facilitates the evacuation of the chips removed from the workpiece 10. It has been found that the use of a cup-shaped cup mill 28 in machining airfoil blades enables to save about 70% of the roughing time.

Once a pair of facing airfoil surfaces of two consecutive blades has been defined, the cup mill is retracted and the workpiece 10 is circumferentially indexed to permit the machining of another pair of facing airfoil surfaces.

It is understood that other types of annular or circular machining tool could be used instead of a cup mill. For instance, the cup mill could be replaced by a grinding wheel, an electro-grinding wheel, a circular or annular EDM electrode or a circular ECM electrode.

The use of an annular machining tool or of a cup-shaped machining tool for machining airfoil blades in a workpiece has the following advantages over the traditional point milling and flank milling methods:

a) High productivity provided by:

Milling—stiffer milling tool with a great number of cutting inserts, better chip evacuation, higher chip load (cutting on the blade root);

Grinding—large tool diameter providing for high rotary speed required by the grinding proceeds;

Electro-grinding—high rotary speed and high capacity to evacuate the removed material due to a small immersion of the tool into the workpiece, EDM and ECM—the use of a circular electrode provides for a high metal removal rate and a high productivity because of the rotative movement of the tool and the limited contact thereof with the workpiece;

b) Longer tool life provided by:

Milling—stiffer milling tool with plurality of coated carbide or ceramic inserts, small portion of the tool simultaneously involved in cutting, configuration of the cutting edge, less vibration (more rigid tool and work on the blade root) and the possibility to apply variable pitch for cup mill;

Grinding, electro-grinding EDM and ECM—small portion of the tool simultaneously involved in cutting, improved chip evacuation;

c) Low manufacturing cost of the tool:

Milling—replaceable cutting inserts and simple shape of the tool body (easy to manufacture);

Grinding, electro-grinding EDM and ECM—simple shape of the cutting and grinding tools or the electrode.

What is claimed is:

1. A method for machining an integrally bladed gas turbine engine rotor from a workpiece to form radially extending airfoil blades, comprising the steps of:
a) mounting the workpiece on a workpiece holder of a numerically controlled multi-axis machining system, b) providing said multi-axis machining system with a circular machining tool defining a machining ring having concave and convex circumferential machining surfaces, and c) machining successive circumferentially spaced-apart airfoil blades at the periphery of the workpiece, under the direction of a machine program of the numerically controlled multi-axis machining system, by successively generating pairs of facing airfoil surfaces of consecutive airfoil blades at predetermined circumferential locations around the workpiece, wherein for each pair of facing airfoil surfaces, said concave and convex circumferential machining surfaces are located in a space between two consecutive airfoil blades to be defined to respectively machine a convex suction side and a concave pressure side of the two consecutive airfoil blades.

2. A method as defined in claim 1, wherein step c) includes generating radial and axial engagement movements between the workpiece and the circular machining tool, the axial and radial engagement movements being related to said multi-axis machining system.

3. A method as defined in claim 2, wherein step c) includes axially and radially feeding said circular machining tool in engagement with the workpiece.

4. A method as defined in claim 1, wherein said circular machining tool defines an annular forward machining end, and wherein step c) includes simultaneously controlling the engagement of the annular forward machining end and of the concave and convex circumferential surfaces of the circular machining tool with the workpiece.

5. A method as defined in claim 1, wherein step b) comprises the step of selecting a circular machining tool having a radius close to a radius of curvature of an airfoil blade to be machined.

6. A method as defined in claim 1, wherein step c) is effected by moving the machining ring inside a space between two consecutive blades so that said machining ring removes material from the workpiece always near to a root of the airfoil blades being machined.

7. A method as defined in claim 1, wherein said circular machining tool includes a circular milling cutter.

8. A method for machining a gas turbine engine rotor having airfoils from a workpiece utilizing a numerically controlled multi-axis machining system, comprising the steps of: a) mounting the workpiece to a fixture forming part of the numerically controlled multi-axis machining system, b) providing said machining system with an annular machining tool defining a single ring having inner and outer circumferential machining surfaces, c) under the direction of a machine program of the numerically controlled multi-axis machining system, generating movements between said fixture and said annular machining tool to generate facing convex and concave airfoil surfaces of two consecutive blades in the workpiece, respectively, with said inner and outer circumferential machining surfaces.

9. A method as defined in claim 8, wherein step c) includes generating radial and axial engagement movements between the workpiece and the annular machining tool, the axial and radial engagement movements being related to said multi-axis machining system.

10. A method as defined in claim 9, wherein step c) includes axially and radially feeding said annular machining tool in engagement with the workpiece.

11. A method as defined in claim 8, wherein said annular machining tool defines an annular forward machining end, and wherein step c) includes simultaneously controlling the engagement of the annular forward machining end and of the outer and inner circumferential surfaces of the annular machining tool with the workpiece.

12. A method an defined in claim 8, wherein step c) is effected by moving the annular machining tool inside a space between two consecutive airfoil surfaces so that said annular machining tool removes material from the workpiece always near to a root of the airfoil being machined.

13. A method as defined in claim 8, wherein said annular machining tool includes a milling cutter.

14. A method of machining airfoil surfaces of a fan or compressor rotor in a workpiece utilizing a numerically controlled multi-axis machining system, the method comprising the steps of: a) mounting a workpiece on a workpiece holder forming part of the numerically controlled multi-axis machining system, b) providing said multi-axis machining system with a rotating circular machining tool defining a single machining ring having inner and outer circumferential surfaces, and c) machining one curved slot at a time in a periphery of the workpiece by generating engagement movements between the rotating circular machining tool and the workpiece so as to define a concave side of a first airfoil with said outer circumferential surface of said machining ring and a convex side of an adjacent airfoil with the inner circumferential surface of said machining ring.

15. A method as defined in claim 14, wherein step c) includes axially and radially feeding with respect to a tool axis, said circular machining tool in engagement with the workpiece.

16. A method as defined in claim 14, wherein said circular machining tool defines an annular forward machining end, and wherein step c) includes simultaneously controlling the engagement of the annular forward machining end and of the outer and inner circumferential surfaces of the circular machining tool with the workpiece.

17. A method as defined in claim 14, wherein step c) is effected by moving the machining ring inside a space between two consecutive airfoil surfaces so that said machining ring removes material from the workpiece always near to a root of the airfoil surfaces being machined.

* * * * *